United States Patent
Reisner et al.

(10) Patent No.: US 9,954,562 B2
(45) Date of Patent: *Apr. 24, 2018

(54) CIRCUITS AND METHODS RELATED TO RADIO-FREQUENCY POWER COUPLERS

(71) Applicant: SKYWORKS SOLUTIONS, INC., Woburn, MA (US)

(72) Inventors: Russ Alan Reisner, Newbury Park, CA (US); John C. Baldwin, Tarzana, CA (US)

(73) Assignee: Skyworks Solutions, Inc., Woburn, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/967,715

(22) Filed: Dec. 14, 2015

(65) Prior Publication Data

US 2016/0099731 A1 Apr. 7, 2016

Related U.S. Application Data

(63) Continuation of application No. 14/062,873, filed on Oct. 24, 2013, now Pat. No. 9,214,967.

(60) Provisional application No. 61/719,865, filed on Oct. 29, 2012.

(51) Int. Cl.
H04B 1/04 (2006.01)
H04B 1/00 (2006.01)

(52) U.S. Cl.
CPC .............. H04B 1/04 (2013.01); H04B 1/006 (2013.01); H04B 1/0458 (2013.01)

(58) Field of Classification Search
CPC .................................. H04B 1/04; H04B 1/006

USPC ......................................................... 455/113
See application file for complete search history.

(56) References Cited

U.S. PATENT DOCUMENTS

| 6,816,714 | B2 | 11/2004 | Toncich | |
|---|---|---|---|---|
| 7,187,910 | B2 | 3/2007 | Kim et al. | |
| 8,606,198 | B1 * | 12/2013 | Wright | H01P 5/18 |
| | | | | 333/109 |
| 9,214,967 | B2 * | 12/2015 | Reisner | H04B 1/04 |
| 2005/0212617 | A1 | 9/2005 | Chen | |
| 2008/0227413 | A1 | 9/2008 | Lindskog | |

(Continued)

FOREIGN PATENT DOCUMENTS

| CN | 201310757341.9 | 10/2013 |
|---|---|---|
| KR | 10-2013-128301 | 10/2013 |

(Continued)

OTHER PUBLICATIONS

U.S. Appl. No. 14/062,873, filed Oct. 24, 2013, Reisner; Russ Alan.

*Primary Examiner* — Sanh Phu
(74) *Attorney, Agent, or Firm* — Chang & Hale LLP

(57) ABSTRACT

Circuits and methods related to radio-frequency (RF) power couplers. In some embodiments, an RF circuit can include a first circuit having a frequency response that includes a feature within a selected frequency range, and a second circuit coupled to the first circuit such that the feature of the frequency response is at least in part due to the coupling. The RF circuit can further include an adjustment circuit configured to move the feature away from the selected frequency range. In some embodiments, such an RF circuit can be implemented in a packaged module which in turn can be included in a wireless device.

17 Claims, 14 Drawing Sheets

(56) References Cited

U.S. PATENT DOCUMENTS

| | | |
|---|---|---|
| 2010/0308933 A1 | 12/2010 | See et al. |
| 2011/0057746 A1* | 3/2011 | Yamamoto ............... H01P 5/18 333/116 |
| 2011/0063044 A1 | 3/2011 | Jones |

FOREIGN PATENT DOCUMENTS

| | | |
|---|---|---|
| TW | 120139137.0 | 10/2013 |
| TW | 105139170.0 | 11/2016 |

* cited by examiner

CIRCUITS AND METHODS RELATED TO RADIO-FREQUENCY POWER COUPLERS

CROSS-REFERENCE TO RELATED APPLICATIONS

This application is a continuation of U.S. application Ser. No. 14/062,873 filed Oct. 24, 2013, entitled CIRCUITS AND METHODS FOR REDUCING INSERTION LOSS EFFECTS ASSOCIATED WITH RADIO-FREQUENCY POWER COUPLERS, which claims priority to and the benefit of the filing date of U.S. Provisional Application No. 61/719,865 filed Oct. 29, 2012 entitled CIRCUITS AND METHODS FOR REDUCING INSERTION LOSS NOTCHES ASSOCIATED WITH RADIO-FREQUENCY POWER COUPLERS, the benefits of the filing dates of which are hereby claimed and the disclosures of which are hereby expressly incorporated by reference in their entirety.

BACKGROUND

Field

The present disclosure generally relates to reducing insertion loss effects associated with radio-frequency power couplers.

Description of the Related Art

In some wireless devices, power couplers can be used to, for example, limit maximum power of transmitted signals for a plurality of bands. Such power couplers can be daisy-chained together to share a coupled line, to thereby space on a circuit board.

Such a configuration can result in insertion loss notches associated with the daisy-chain line at high frequency bands due to various interactions. Problems associated with such insertion loss notches can be more severe if an insertion loss notch in a frequency range of a given band is sufficiently large and cannot be calibrated-out.

SUMMARY

In accordance with a number of implementations, the present disclosure relates to a radio-frequency (RF) circuit that includes a first path configured to route a first RF signal in a first band, and a second path configured to route a second RF signal in a second band. The RF circuit further includes a power detector having a first coupler configured to detect power along the first path, and a second coupler configured to detect power along the second path. The first coupler and the second coupler are connected in a daisy-chain configuration. The RF circuit further includes an adjustment circuit implemented along at least one of the first path and the second path. The adjustment circuit is configured to move a frequency response feature associated with the power detector to a different frequency range.

In some embodiments, the adjustment circuit can be part of the second path. Each of the first path and the second path can include a power amplifier (PA), an output match network connected to the PA, and the respective power coupler. The second path can further include the adjustment circuit implemented between the output match network and the second power coupler. The adjustment circuit can include an inductance, such as an inductor, implemented between the output match network and the second power coupler. The adjustment circuit can further include a capacitance, such as a capacitor, connected in series with the inductance.

In some embodiments, the output match network can include a matching inductance connected to an output of the PA, and a shunt capacitance connected to an output of the matching inductance.

In some embodiments, the frequency response feature can include a notch in a power spectrum associated with the power detector. In some embodiments, the first band can include an E-UTRA band B7, B38 or B40. The second band can include an E-UTRA band B18 or B8.

In some embodiments, the different frequency range can include a range that is not utilized by the first or second path. In some embodiments, the different frequency range can include a frequency range between E-UTRA bands B8 and B4. In some embodiments, the adjustment circuit can be configured to move the notch to a lower frequency. In some embodiments, the lower frequency where the notch moves to can be between frequencies associated with the first band and the second band.

In some implementations, the present disclosure relates to a radio-frequency (RF) module that includes a packaging substrate configured to receive a plurality of components, and an RF circuit implemented on the packaging substrate. The RF circuit includes a first path configured to route a first RF signal in a first band, and a second path configured to route a second RF signal in a second band. The RF circuit further includes a power detector having a first coupler configured to detect power along the first path and a second coupler configured to detect power along the second path. The first coupler and the second coupler are connected in a daisy-chain configuration. The RF circuit further includes an adjustment circuit implemented along at least one of the first path and the second path. The adjustment circuit is configured to move a frequency response feature associated with the power detector to a different frequency range.

In some embodiments, the RF module can be a power amplifier module, such that the first path includes an output of a first power amplifier (PA) and the second path includes an output of a second PA. In some embodiments, both of the first and second PAs can be implemented on a semiconductor die.

According to a number of implementations, the present disclosure relates to a radio-frequency (RF) device that includes a transceiver configured to process RF signals, and an antenna in communication with the transceiver and configured to facilitate transmission of an amplified RF signal. The RF device further includes a power amplifier (PA) module connected to the transceiver and configured to generate the amplified RF signal. The PA module includes a first path configured to route a first RF signal in a first band, and a second path configured to route a second RF signal in a second band. The PA module further includes a power detector having a first coupler configured to detect power along the first path and a second coupler configured to detect power along the second path. The first coupler and the second coupler are connected in a daisy-chain configuration. The PA module further includes an adjustment circuit implemented along at least one of the first path and the second path. The adjustment circuit is configured to move a frequency response feature associated with the power detector to a different frequency range. In some embodiments, the RF device can include a wireless device.

In a number of teachings, the present disclosure relates to a radio-frequency (RF) circuit that includes a first circuit having a frequency response that includes a feature within a selected frequency range. The RF circuit further includes a second circuit coupled to the first circuit such that the feature of the frequency response is at least in part due to the coupling. The RF circuit further includes an adjustment circuit configured to move the feature away from the selected frequency range.

In some embodiments, the feature, such as an insertion loss notch, can be moved to a lower frequency.

According to a number of implementations, the present disclosure relates to a method for operating a radio-frequency (RF) device. The method includes detecting power along a first path and along a second path in a daisy-chain configuration. The first path is configured to route a first RF signal in a first band, and the second path is configured to route a second RF signal in a second band. The method further includes adjusting at least one of the first path and the second paths to move a frequency response feature associated with the power detection to a different frequency range.

In some implementations, the present disclosure relates to a method for operating a radio-frequency (RF) device. The method includes coupling a first circuit and a second circuit, with the first circuit having a frequency response that includes a feature within a selected frequency range. The feature of the frequency response results at least in part due to the coupling. The method further includes adjusting the second circuit to move the feature away from the selected frequency range.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

Figure 1A:
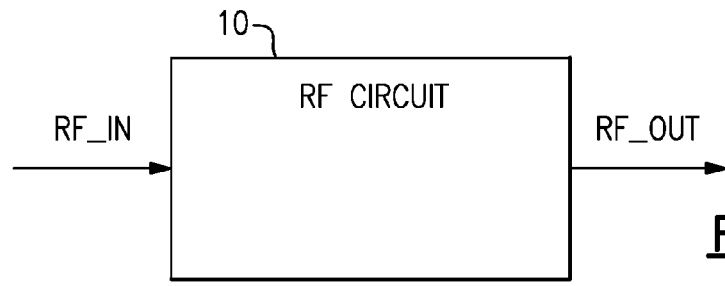
FIGS. 1A and 1B show that in some configurations, a radio-frequency (RF) circuit can result in an undesirable response in a frequency band of interest.
Figure 1B:
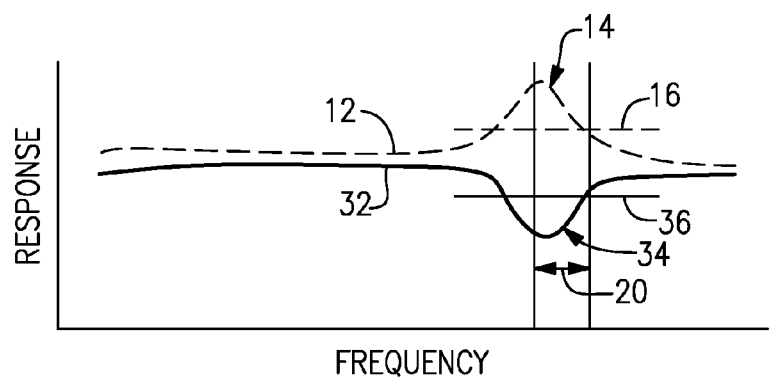

FIG. 1A schematically depicts a radio-frequency (RF) circuit 10 that can be configured to receive an RF signal (RF_in) and generate an output signal (RF_out). In some situations, and as shown in FIG. 1B, such a circuit can yield a frequency response that includes an undesirable decrease or increase within a selected frequency range 20. For example, a frequency response curve 12 is shown to include a peak 14 that resides partly within the frequency range 20 and exceeding a threshold value 16. In another example, a frequency response curve 32 is shown to include a dip 34 that resides partly within the frequency range 20 and being below a threshold value 36.

Figure 2A:
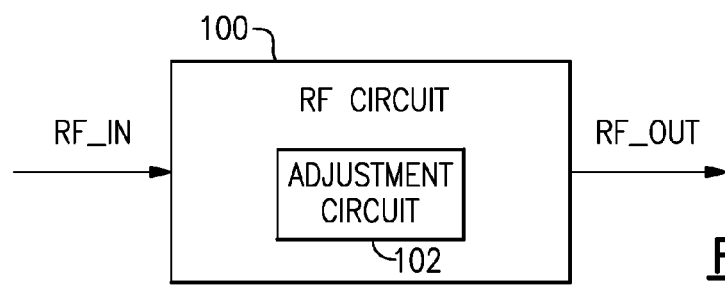
FIGS. 2A and 2B show that in some implementations, an adjustment circuit can be provided to the RF circuit of FIG. 1 to move the undesirable response away from the frequency band of interest.

FIG. 2A shows that in some implementations, an RF circuit 100 can include an adjustment circuit 102. For the purpose of description herein, it will be assumed that the RF circuit 100 without the adjustment circuit 102 can behave similar to the RF circuit described in reference to FIGS. 1A and 1B.

Figure 2B:
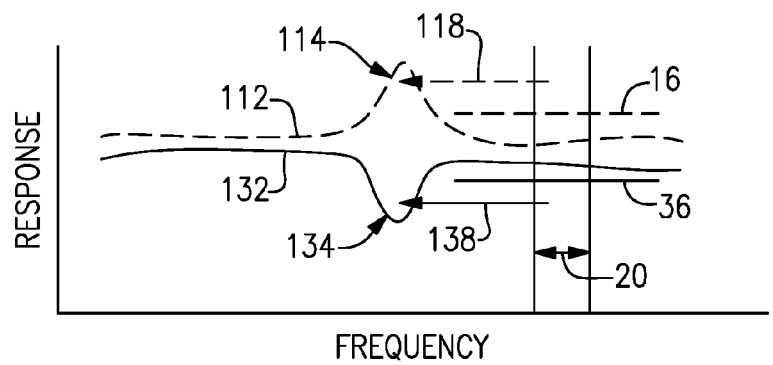

The presence of the adjustment circuit 102 is shown to yield adjusted frequency responses, and examples of such adjustments are depicted in FIG. 2B. For example, a frequency response curve 112 that corresponds to the example response curve 12 of FIG. 1B is shown to include a peak 114 that has been moved out of the frequency range 20. Thus, the portion of the response curve 112 within the frequency range 20 is below the threshold value 16. In another example, a frequency response curve 132 that corresponds to the example response curve 32 of FIG. 1B is shown to include a dip 134 that has been moved out of the frequency range 20. Thus, the portion of the response curve 132 within the frequency range 20 is above the threshold value 36.

In FIG. 2B, the example peak 114 and the example dip 134 are depicted as being moved (e.g., arrows 118, 138) to lower frequencies. It will be understood, however, that such movements can also be made to higher frequencies.

Figure 3:
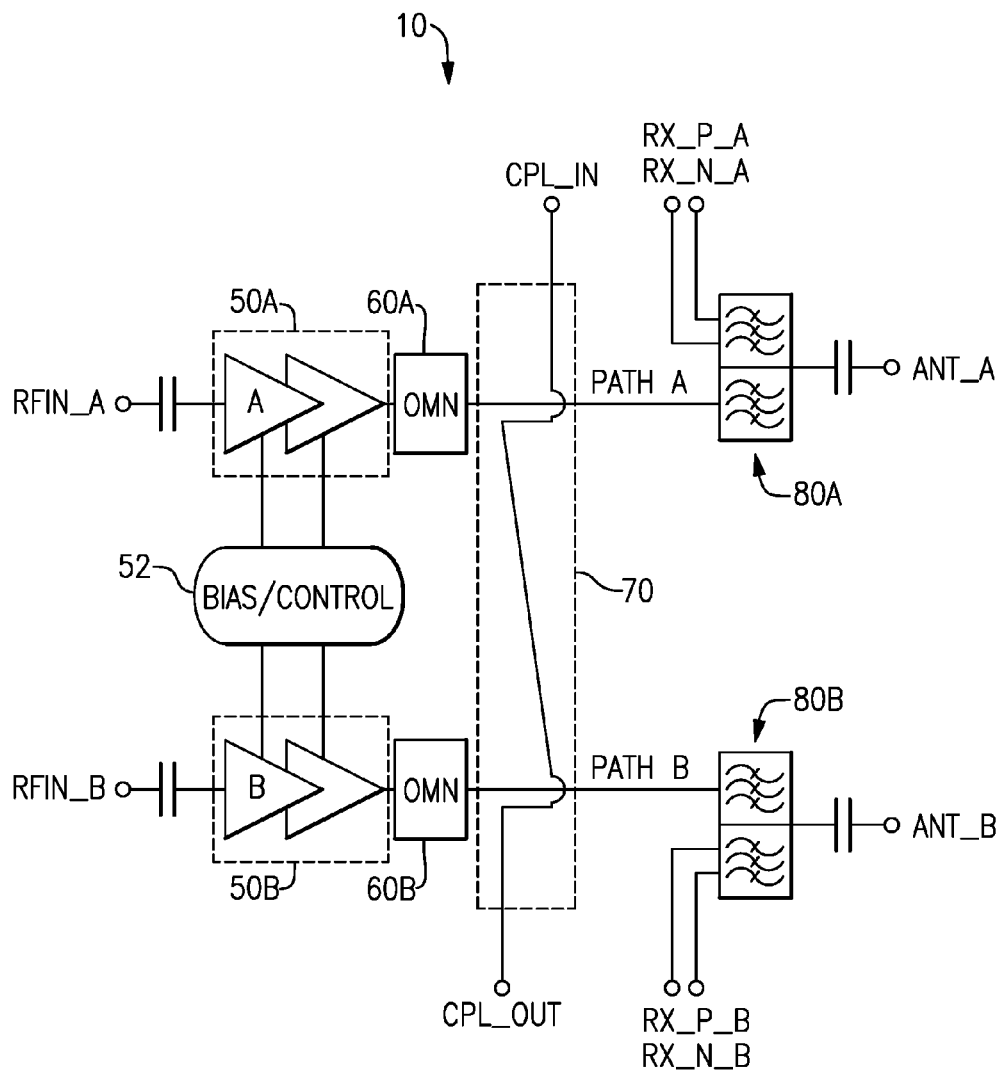
FIG. 3 shows an example RF circuit that can result in an undesirable response in an operating band.

FIG. 3 shows an example RF circuit 10 that can benefit from one or more features as described herein. The circuit 10 generally relates to power couplers for RF devices such as wireless handsets. Such power couplers can be utilized to, for example, limit the maximum transmitted power or the specific absorption rate (SAR) of wireless devices.

In the example circuit 10, a power coupler assembly can be generally indicated as 70 and be configured to provide power detection functionality for two example bands A and B. The first band A (e.g., a high band) is shown to be facilitated by Path A that includes an RF input (RFIN_A) for a power amplifier (PA) 50a. The PA 50a can include one or more stages, and an output of the last stage is shown to be connected to an output matching network 60a. Although not shown in FIG. 3, Path A can also include an input matching network and/or one or more inter-stage matching networks.

An output of the matching network 60a is shown to be coupled with a power coupling element before being provided to a duplexer 80a configured to provide duplex functionality between transmission (e.g., of amplified RF signal through Path A) and reception (e.g., of received signal to RX_P_A and RX_N_A) utilizing one or more antennas connected to a node ANT_A.

Similarly, the second band B (e.g., a low band) is shown to be facilitated by Path B that includes an RF input (RFIN_B) for a power amplifier (PA) 50b. The PA 50b can include one or more stages, and an output of the last stage is shown to be connected to an output matching network 60b. Although not shown in FIG. 3, Path B can also include an input matching network and/or one or more inter-stage matching networks. An output of the matching network 60b is shown to be coupled with a power coupling element before being provided to a duplexer 80b configured to provide duplex functionality between transmission (e.g., of amplified RF signal through Path B) and reception (e.g., of received signal to RX_P_B and RX_N_B) utilizing one or more antennas connected to a node ANT_B.

In the example circuit 10, the PAs 50a, 50b are shown to be biased and controlled by a bias/control circuit 52. In some implementations, such biasing and/or controlling operations can be performed in known manners.

In the example circuit 10, the coupler output of each band can be either combined using a power-combiner circuit (not shown) or daisy-chained together where every coupler shares a coupled line. The daisy-chain design can be used to, for example, save space on a circuit board (e.g., a phone board) over the power-combining design.

In some configurations, power detection at an output of a low-band PA with daisy-chain couplers can create insertion loss notches in the daisy-chain line at high frequency bands due to output matching network, coupler, and/or duplexer interactions. In some situations, this problem can be more severe for designs where higher-frequency bands exist along with low-frequency bands. The notch depth can vary; and can be equal to or greater than a transceiver detector's dynamic range and therefore typically cannot be calibrated-out during phone board calibration. In the context of an example dual-band configuration, two of the foregoing daisy-chain notches can be created.

Figure 4A:
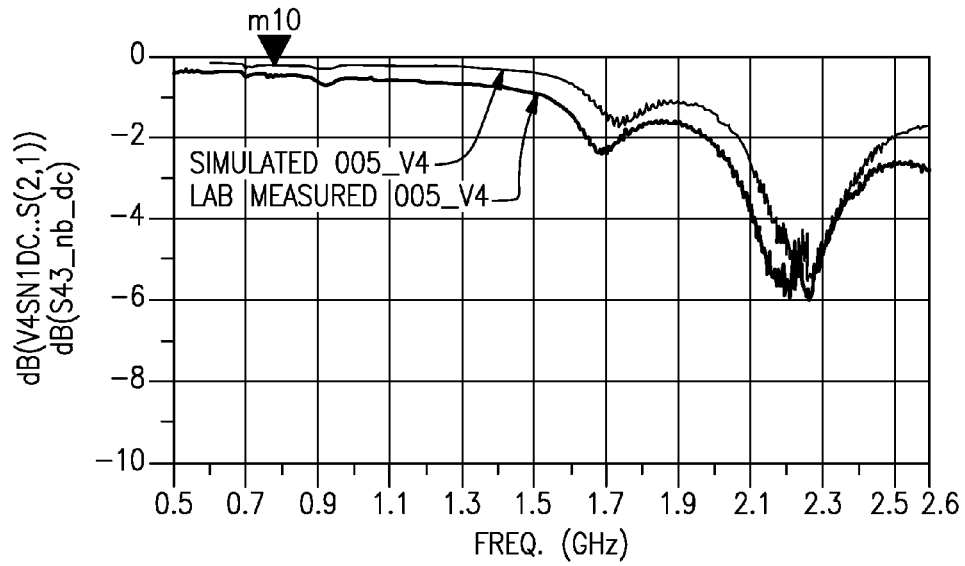
FIGS. 4A-4C show various examples of notches in frequency responses associated with the example circuit of FIG. 3.
Figure 4B:
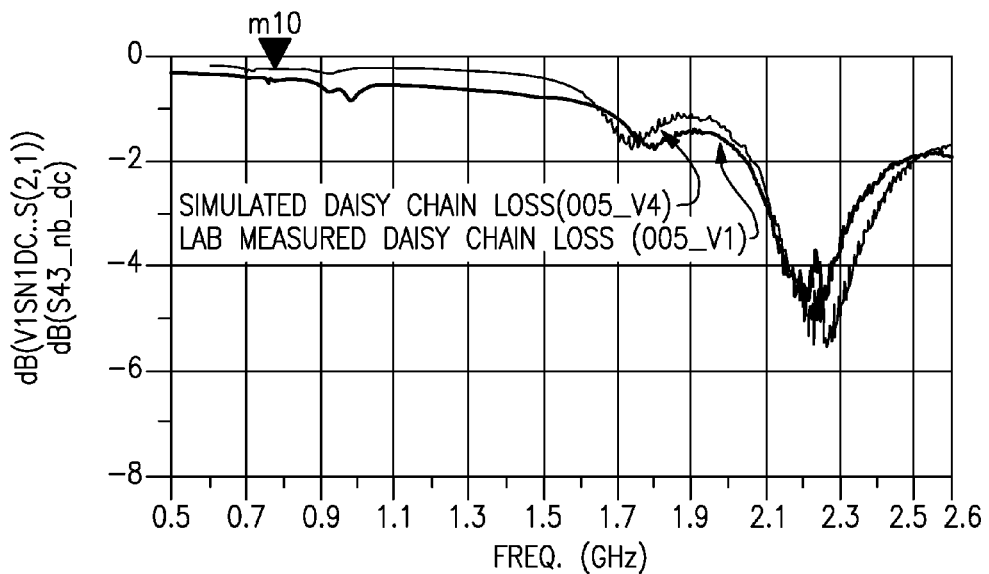
Figure 4C:
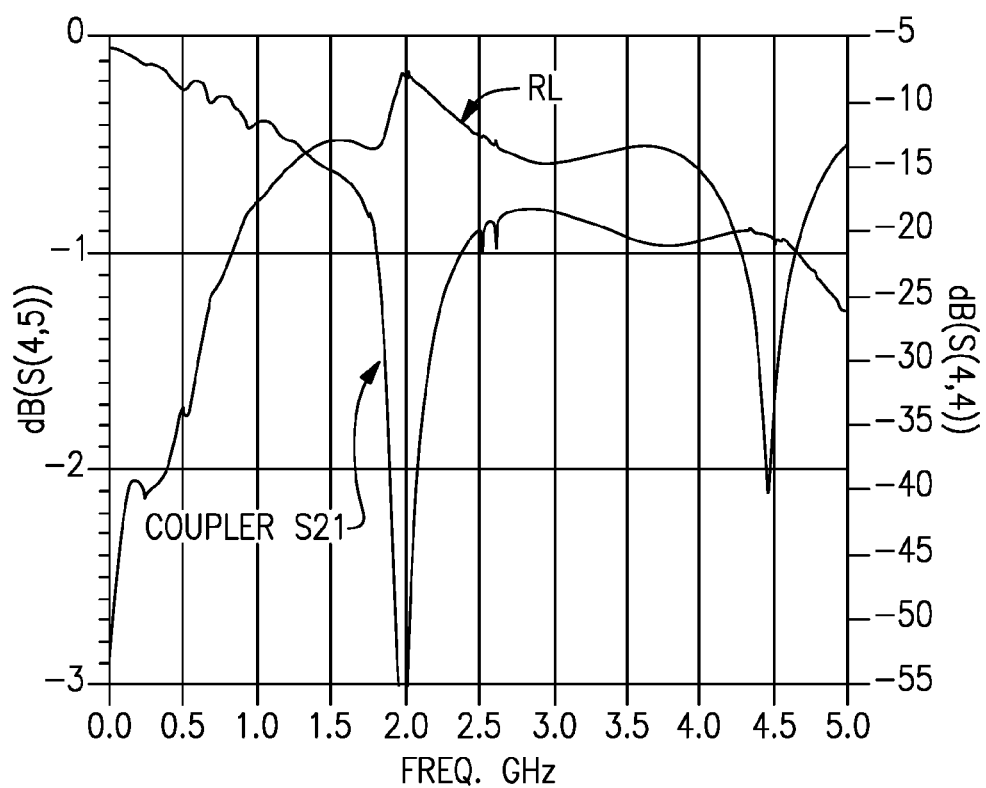

FIGS. 4A-4C show examples of the notches in frequency response that can result in daisy-chained couplers (e.g., 70 in FIG. 3) in the presence of either or both of the two RF paths (Path A and Path B). In FIG. 4A, simulated and measured responses of a daisy-chained coupler assembly are shown for forward power spectra in terms of S-parameter S21. Such a daisy-chained coupler assembly can be utilized for an example dual-band PA circuit. In both responses, deep and significant notches are present in a frequency range of about 2.0 to 2.6 GHz. Such a range can include or overlap with E-UTRA (Evolved Universal Terrestrial Radio Access) operating frequency bands such as B7, B34, B38, and B40.

In FIG. 4B, similar simulated and measured responses of a daisy-chained coupler assembly are shown for forward power spectra in terms of S-parameter S21. Such a daisy-chained coupler assembly is for another example dual-band PA circuit. In both responses, deep and significant notches are present in a frequency range of about 2.0 to 2.6 GHz. Such a range can include or overlap with E-UTRA operating frequency bands such as B7, B34, B38, and B40.

In FIG. 4C, an example notch in forward power spectrum for S21 and an example corresponding return loss (RL) peak are shown to provide significant degradation at and around a frequency of about 2.0 GHz. Such a frequency range can overlap significantly with, and thereby impact, an operating band such as B1.

Lossless approaches to completely eliminate the foregoing daisy-chain notches generally have not been successful. Described herein are various examples of circuits and methods for moving such a notch from an operating band to a frequency range where the impact of the notch is reduced or substantially eliminated for that operating band. In some implementations, such a frequency range where the notch is moved to can include an unused frequency range. In some implementations, the unused frequency range can be completely unused for a given wireless device. In some implementations, the unused frequency range can include a range that is unused during operation in the operating band, but can be used in another operating mode.

Figure 5A:
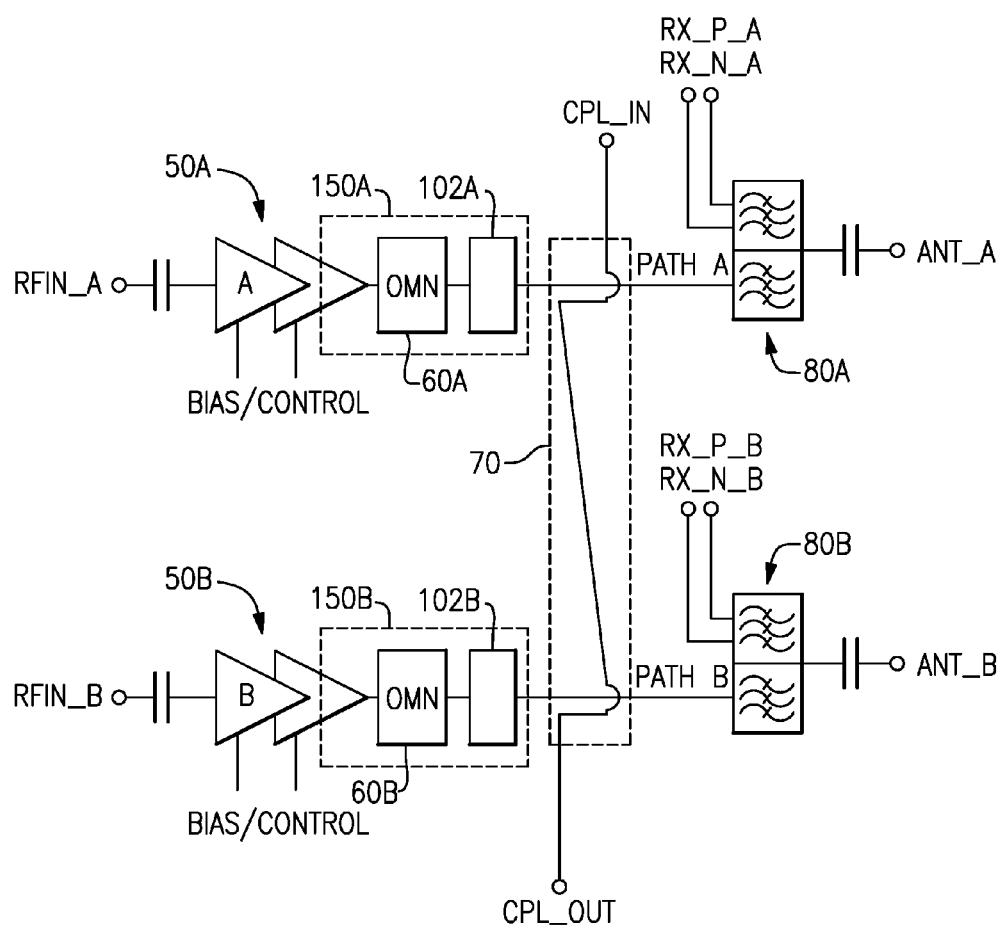
FIGS. 5A and 5B show examples of RF circuits each having an adjustment circuit configured to move notch responses away from an operating band.
Figure 5B:
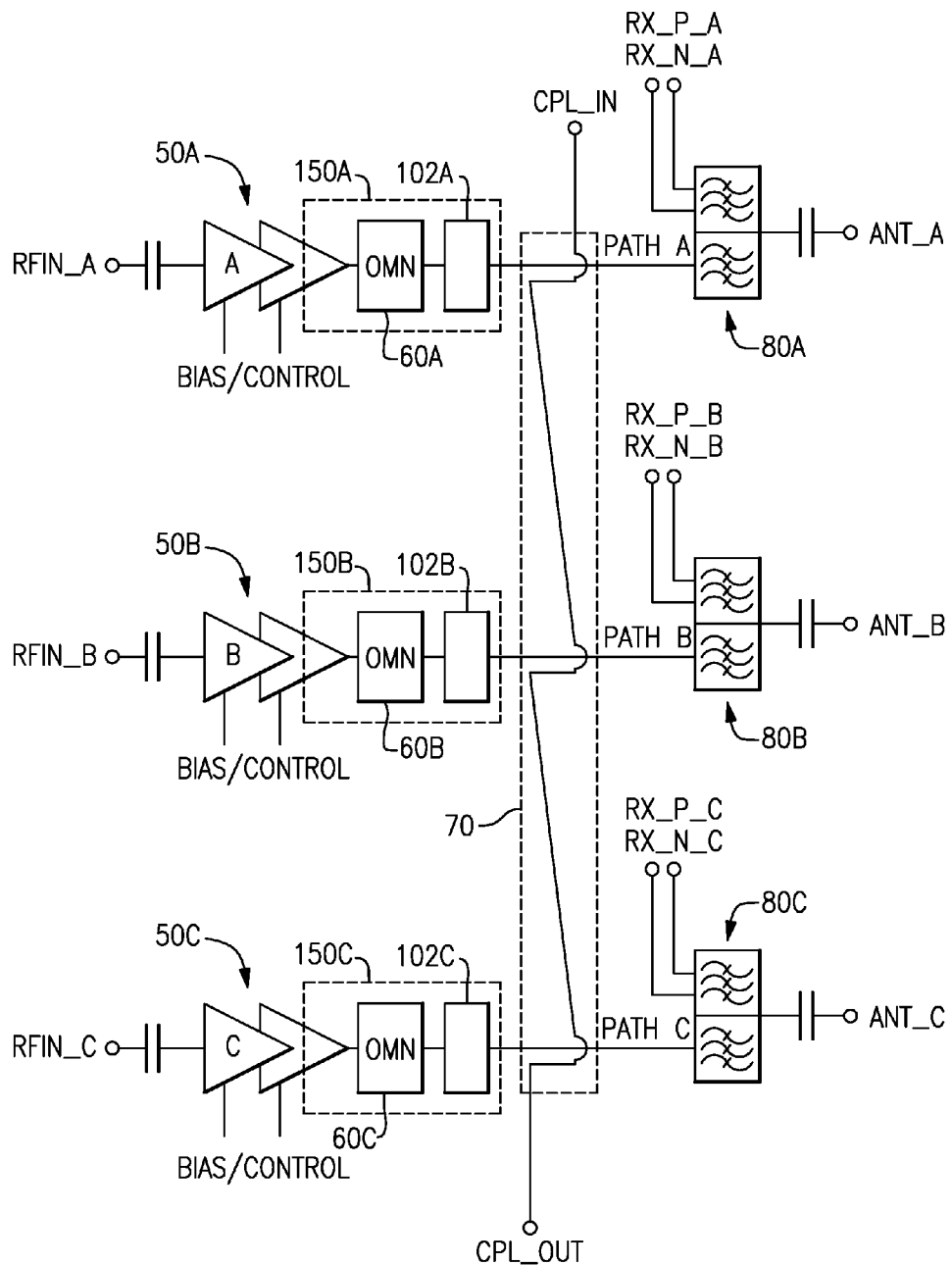

FIGS. 5A and 5B show examples of circuits that are similar to the example circuit 10 of FIG. 3, but with an adjustment circuit 102 provided in a given RF signal path. Examples of such an adjustment circuit 102 are described herein in greater detail. FIG. 5A shows that one or more features of the present disclosure can be implemented in a configuration having two RF signal paths similar to the example of FIG. 3. FIG. 5B shows that one or more features of the present disclosure can be implemented in a configuration having more than two RF signal paths.

The example configuration shown in FIG. 5A is similar to that of FIG. 3, but with an addition of adjustment circuits 102a, 102b having one or more features as described herein. Examples of circuit segments 150a, 150b with each including its respective last stage of the PA 50 (50a for the circuit segment 150a, and 50b for the circuit segment 150b), output matching network 60 (60a for the circuit segment 150a, and 60b for the circuit segment 150b), and adjustment circuit 102 (102a for the circuit segment 150a, and 102b for the circuit segment 150b), are described herein in greater detail.

The example configuration shown in FIG. 5B is similar to that of FIG. 5A, but with an addition of a third RF signal path (Path C) and a corresponding adjustment circuit 102c. Examples of circuit segments 150a, 150b, 150c with each including its respective last stage of the PA 50, output matching network 60, and adjustment circuit 102, are described herein in greater detail.

In the examples of FIGS. 5A and 5B, each RF path is shown to include an adjustment circuit 102. In some implementations, not all RF paths need to have such adjustment circuits. For example, high band couplers do not, in general, cause problems in frequencies or frequency ranges of interest (e.g., 0.5 to 2.6 GHz). Notch-responses resulting from such high band couplings are typically located at much higher frequencies (e.g., around 5.5 GHz). Accordingly, in such an example configuration, a high band RF path may or may not have an adjustment circuit 102.

Figure 6:
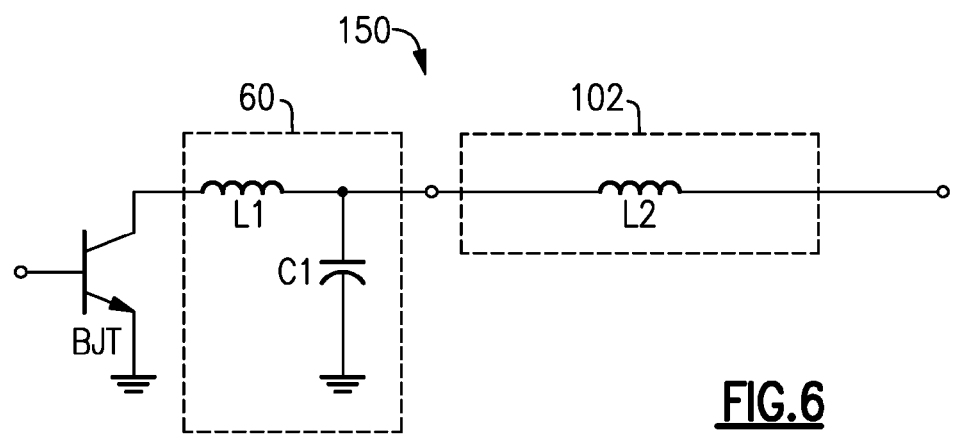
FIG. 6 shows an example of the adjustment circuit of FIG. 5.

FIG. 6 shows an example of the circuit segment 150 described in reference to FIGS. 5A and 5B. In some embodiments, the circuit segment 150 of FIG. 6 can be implemented for each of the circuit segments 150a and 150b of FIG. 5A, and circuit segments 150a-150c of FIG. 5B. In the example, an RF signal being amplified is shown to be provided to a base of a bipolar-junction transistor (BJT) associated with the last stage of a PA (50 in FIGS. 5A and 5B). A collector of the BJT is shown to provide an output of the last stage of the PA, and such an output signal is shown to be matched by an output match network 60. It will be understood that other types of transistors can also be utilized in the PA 50.

The example output match network 60 is shown to include an inductance L1 (e.g., an inductor) along a path connected to the collector of the BJT. The output match network 60 is shown to further include a shunt capacitance C1 (e.g., a capacitor) between the output of the inductance L1 and ground. In some embodiments, a capacitance can be provided so as to be in series with the inductance L1. It will be understood that other types of output match networks can also be utilized.

FIG. 6 shows that in some implementations, an adjustment circuit 102 can include an inductance L2 (e.g., an inductor) that is connected in series with the inductance L1. Thus, the amplified signal can travel from the collector of the BJT, through L1, and through L2 before being provided to a coupling section (e.g., respective portion of daisy-chained couplers 70 in FIGS. 5A and 5B).

Figure 7:
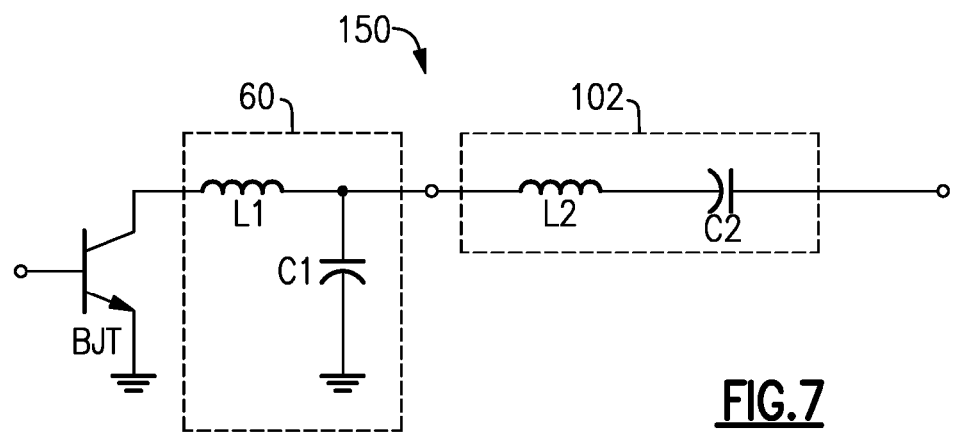
FIG. 7 shows another example of the adjustment circuit of FIG. 5.

FIG. 7 shows another example of the circuit segment 150 described in reference to FIGS. 5A and 5B. In the example, the last stage of the PA 50 and the output matching network 60 can be similar to those described in reference FIG. 6.

FIG. 7 shows that in some implementations, an adjustment circuit 102 can include an inductance L2 (e.g., an inductor) and a capacitor C2 (e.g., a capacitor) connected in series with the inductance L1. Thus, the amplified signal can travel from the collector of the BJT, through L1, through L2, and through C2 before being provided to a coupling section (e.g., respective portion of daisy-chained couplers 70 in FIGS. 5A and 5B).

In some implementations, some or all of the foregoing examples of the adjustment circuit 102 can be configured to modify the out-of-band impedance of the output matching network to shift the notch frequency associated with the daisy-chained coupler assembly into, for example, an unused frequency range between Band 8 and Band 4 (e.g., 0.960 to 1.710 GHz). In some embodiments, the series-LC circuit 102 of FIG. 7 can be configured to provide the foregoing functionality while better reducing or minimizing degradations of other performance factors, such as insertion loss and flatness over frequency, than the inductance-only circuit 102 of FIG. 6.

In some implementations, each of the adjustment circuits 102 of FIGS. 6 and 7 can replace a capacitance (not shown) that is provided along the RF signal path after the output matching network 60 but before the power coupling section. Examples of such replacements and beneficial effects are described herein in greater detail.

Figure 8:
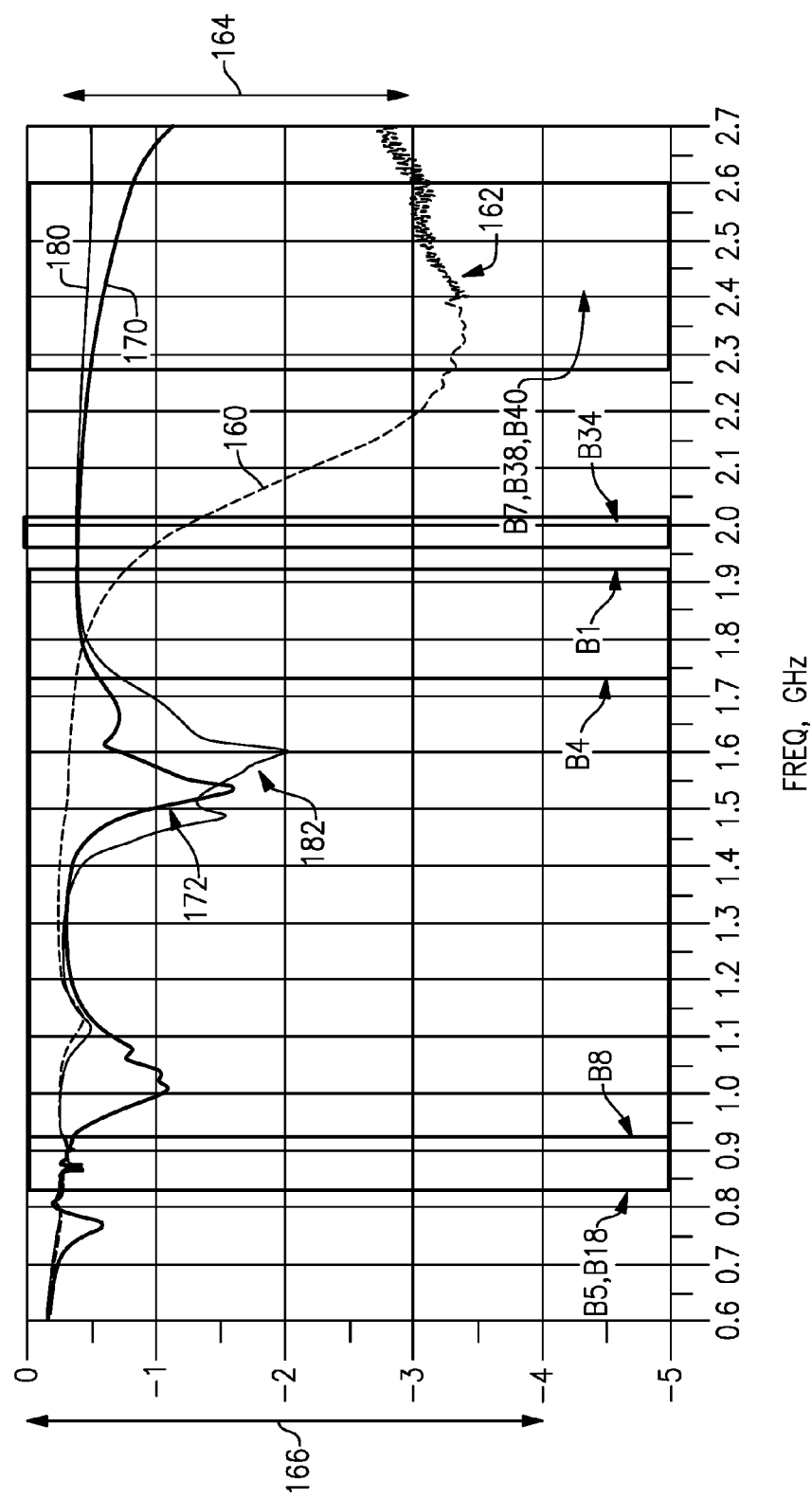
FIG. 8 shows examples of the notch responses moved away from the operating band due to the adjustment circuit.

FIG. 8 shows examples of how a notch that covers or overlaps with one or more operating bands can be moved to an unused frequency range such as the foregoing example range between Band 8 and Band 4. A curve 160 corresponding to the circuit of FIG. 3 is shown to include a notch 162 having values less than an example threshold value of −2 dB in a frequency range that undesirably covers or overlaps with bands B7, B38, and B40.

In the example of FIG. 8, curves 170 and 180 are shown to have their respective notches 172, 182 moved into the unused frequency range between the B8 and B4 bands. The portions of the curves 170, 180 that cover or overlap with the foregoing B7/B38/B40 bands are shown to have values that are well above the −2 dB threshold.

An arrow 164 indicates an approximate gain that can be achieved between the notch 162 of the curve 160 and the generally flattened response of the example curve 180. An arrow 166 representative of a power detection dynamic range (e.g., 4 dB) shows that the unadjusted notch 162 is undesirably close to exceeding the dynamic range, while the shifted notches 172, 182 are well within the dynamic range. Thus, if calibration is desired for either or both of the responses 170, 180, it can be achieved.

The example response curve 170 having its notch 172 shifted out of the operating bands B7/B38/B40 corresponds to an adjustment circuit 102 of FIG. 7 provided for an example low-band B18 signal path. The shunt capacitance C1 of the output matching network 60 has a value of approximately 7.6 pF. The inductance L2 and capacitance C2 of the adjustment circuit 102 have values of approximately 4.3 nH and 5.6 pF, respectively. The adjustment circuit 102 replaces an approximately 18 pF capacitance (not shown) along the signal path at the output of the output matching network 60. In the example of FIG. 7, L1 is an output match inductance (e.g., an inductor coil) which can be implemented as a trace rather than being a distinct surface-mount component. The inductance of L1, having a value of about 2.3 nH in the example, generally does not change in response to the introduction of the adjustment circuit 102.

The example response curve 180 having its notch 182 shifted out of the operating bands B7/B38/B40 corresponds to an adjustment circuit 102 of FIG. 7 provided for an example low-band B8 signal path. The shunt capacitance C1 of the output matching network 60 has a value of approximately 6.8 pF. The inductance L2 and capacitance C2 of the adjustment circuit 102 have values of approximately 4.7 nH and 5.1 pF, respectively. The adjustment circuit 102 replaces an approximately 18 pF capacitance (not shown) along the signal path at the output of the output matching network 60.

Figure 9:
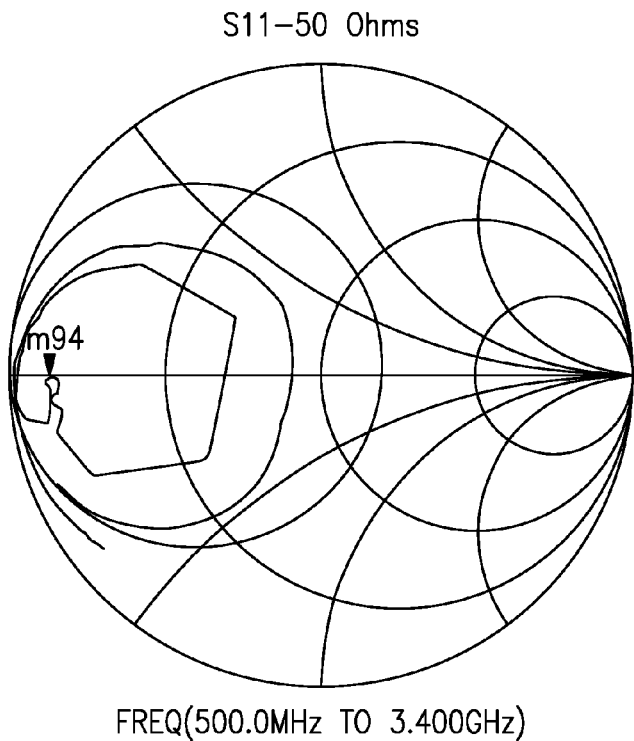
FIGS. 9 and 10 show that insertion loss performance can be generally maintained with the inclusion of the adjustment circuit for an example operating band.
Figure 10:
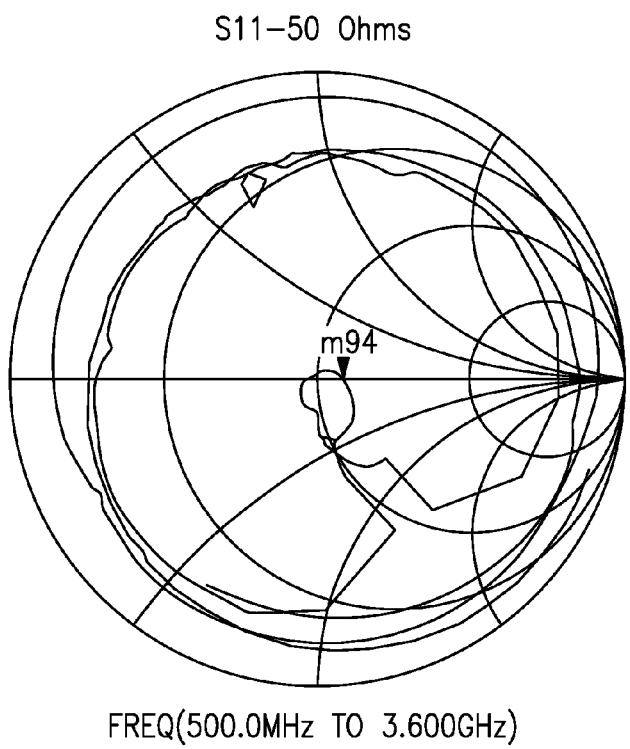
Figure 11:
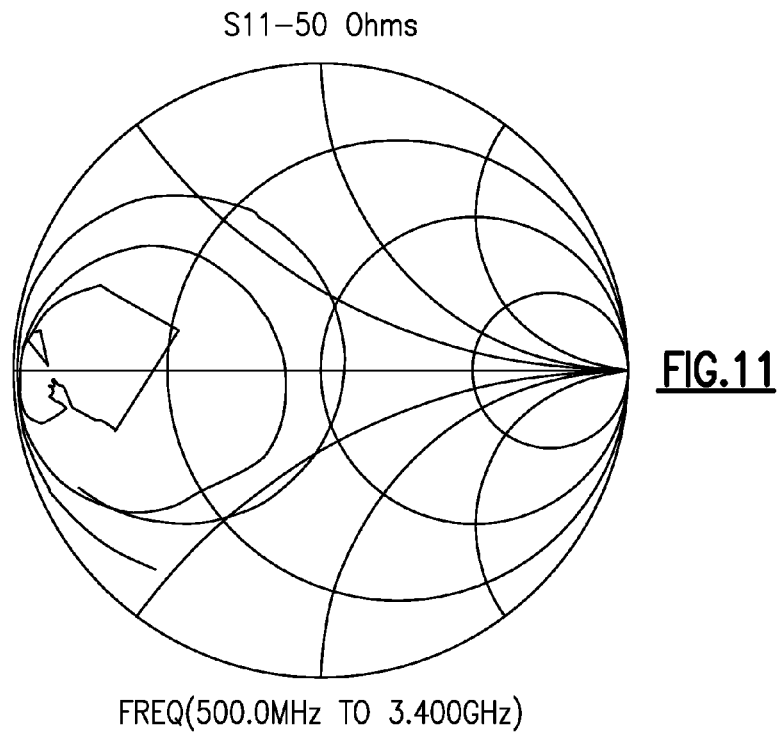
FIGS. 11 and 12 show another example where insertion loss performance can be generally maintained with the inclusion of the adjustment circuit for another operating band.
Figure 12:
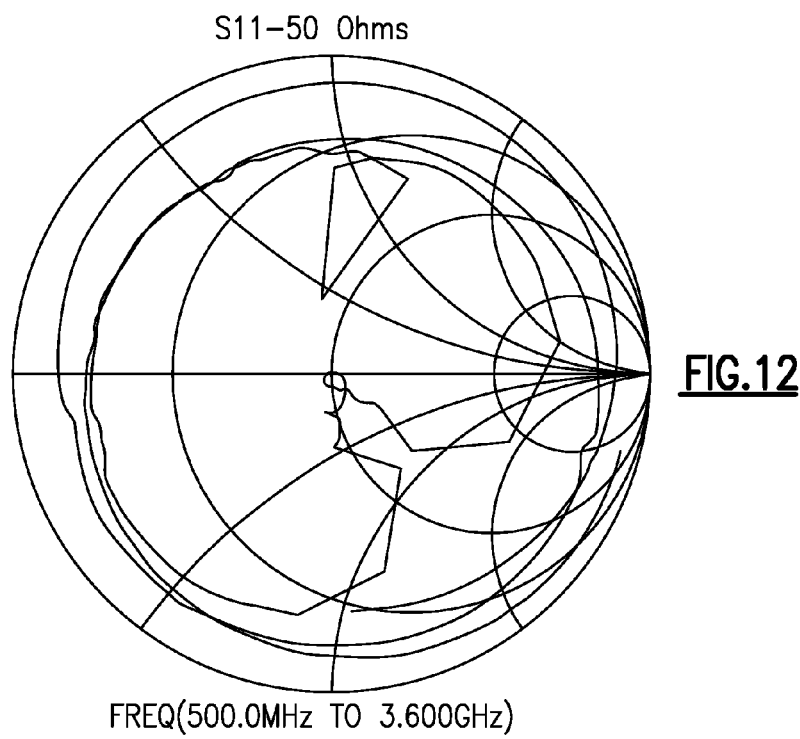

FIGS. 9-12 show that the adjustment circuits as described herein can provide the desirable notch-shifting functionality (e.g., FIG. 8) without significantly degrading performance in other areas. FIGS. 9 and 10 show Smith charts for S11 parameter for the example low-band B18 signal path with (e.g., curve 170 of FIG. 8) and without (e.g., curve 160 of FIG. 8) an adjustment circuit, respectively. FIGS. 11 and 12 show Smith charts for S11 parameter for the example low-band B8 signal path with (e.g., curve 180 of FIG. 8) and without (e.g., curve 160 of FIG. 8) an adjustment circuit, respectively. For all of the foregoing example configurations, each signal path has a load impedance of approximately 50 ohms.

For the B18 band example (FIGS. 9 and 10), input impedance (Zin) measurements were obtained at three frequencies, and the results are listed in Table 1. One can see that the Zin values for the B18 signal path with the adjustment circuit compare favorably with those for the B18 signal path without the adjustment circuit.

TABLE 1

| Frequency (MHz) | B18 Zin without adjustment circuit (FIG. 9) (Ohm) | B18 Zin with adjustment circuit (FIG. 10) (Ohm) |
| --- | --- | --- |
| 816 | 3.282 − j2.094 | 3.192 − j2.005 |
| 832 | 3.317 − j0.468 | 3.226 − j0.448 |
| 848 | 3.184 − j1.832 | 3.173 − j1.815 |

For the B8 band example (FIGS. 11 and 12), input impedance (Zin) measurements were obtained at three frequencies, and the results are listed in Table 2. One can see that the Zin values for the B8 signal path with the adjustment circuit also compare favorably with those for the B8 signal path without the adjustment circuit.

TABLE 2

| Frequency (MHz) | B8 Zin without adjustment circuit (FIG. 11) (Ohm) | B8 Zin with adjustment circuit (FIG. 12) (Ohm) |
|---|---|---|
| 882 | 3.894 - j1.453 | 3.946 - j1.485 |
| 898 | 3.504 - j0.908 | 3.618 - j0.971 |
| 913 | 3.456 - j1.819 | 3.521 - j1.954 |

Figure 13:
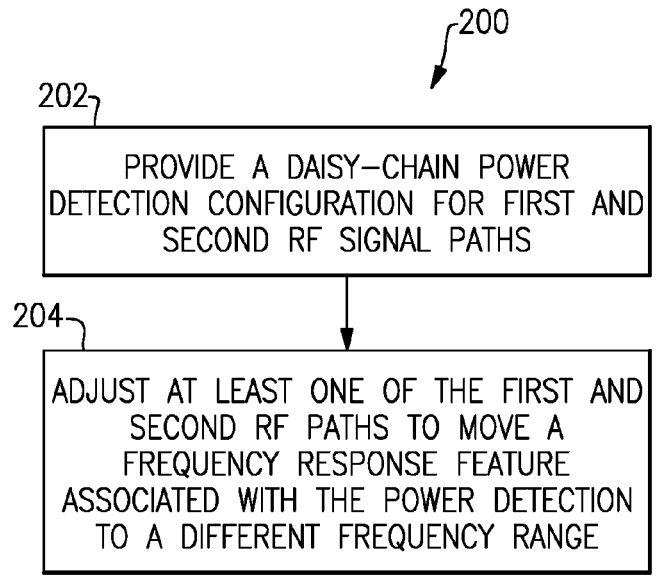
FIG. 13 shows a process that can be implemented to operate an RF device having one or more features as described herein.

FIG. 13 shows a process 200 that can be implemented to operate an RF device having one or more features as described herein. In some embodiments, such an RF device can include one or more circuits such as the examples described in reference to FIGS. 5-7. In block 202, a daisy-chain power detection configuration can be provided for first and second RF signal paths. In block 204, at least one of the first and second RF paths can be adjusted to move a frequency response feature associated with the power detection to a different frequency range.

Figure 14:
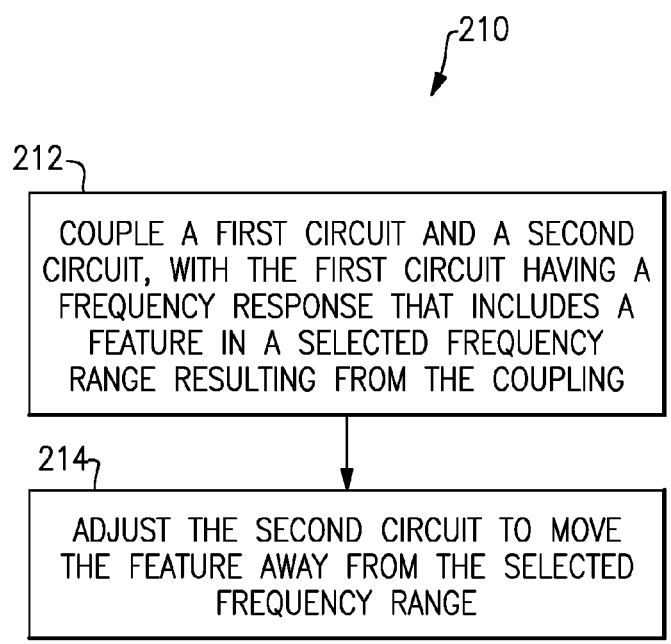
FIG. 14 shows another process that can be implemented to operate an RF device having one or more features as described herein.

FIG. 14 shows a process 210 that can be implemented to operate an RF device having one or more features as described herein. In some embodiments, such an RF device can include one or more circuits such as the examples described in reference to FIGS. 5-7. In block 212, a first circuit and a second circuit of an RF device can be coupled, such that the first circuit includes a frequency response having a feature in a selected frequency range resulting from the coupling. In some embodiments, such a coupling can be implemented as a daisy-chained power detection circuit configured to detect output power levels of first and second RF power amplifiers. In block 214, the second circuit can be adjusted to move the feature away from the selected frequency range. In some implementations, the feature can include a notch in the frequency response. In some implementations, such a notch can be moved to a lower frequency range that is not utilized by either of the first and second circuits.

Figure 15:
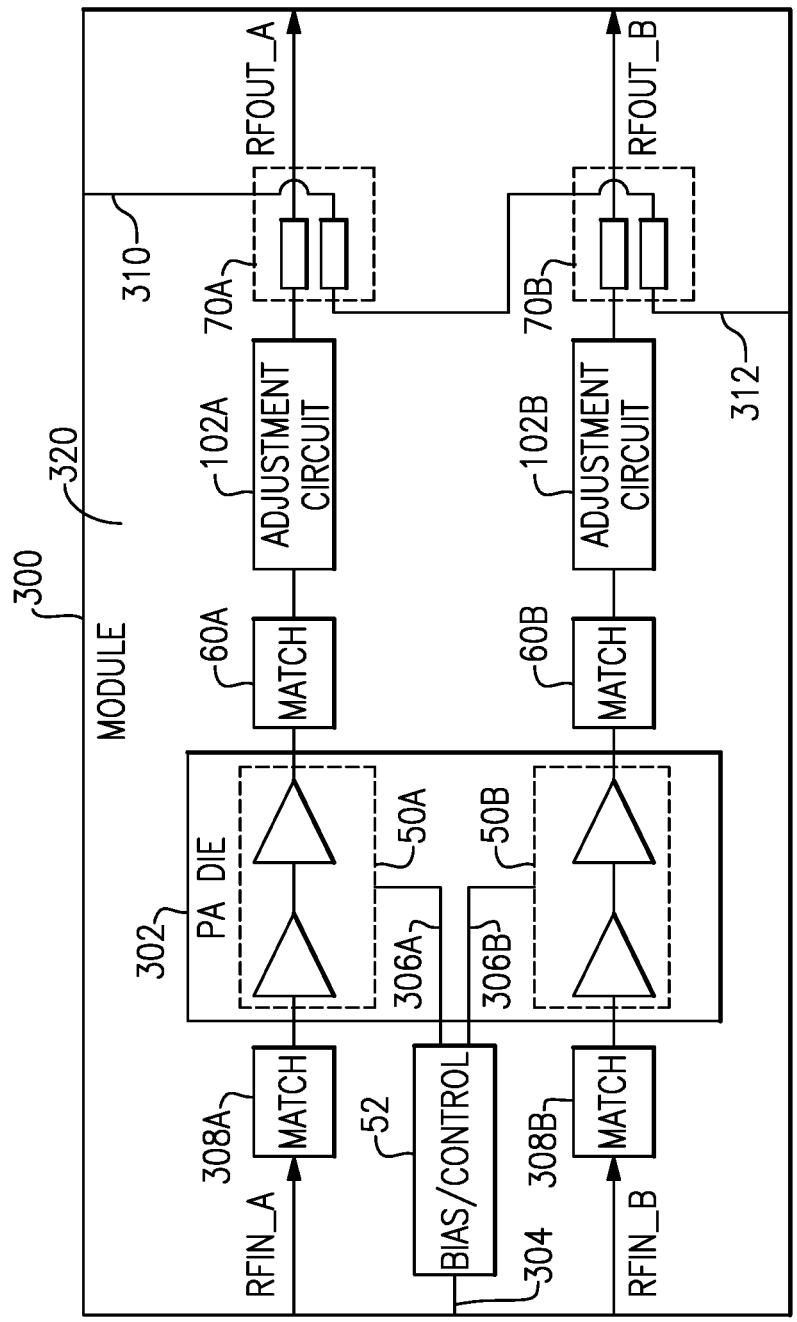
FIG. 15 shows that in some embodiments, one or more features of the present disclosure can be implemented in an RF module.

In some implementations, one or more features described herein can be included in a module. FIG. 15 schematically depicts an example module 300 that includes a PA die 302 having a PA 50 for each of a plurality of amplification paths. By way of examples, first and second amplification paths are shown to include PAs 50a, 50b each having one or more stages; and input RF signals (RFIN_A, RFIN_B) to the PAs 50a, 50b are shown to be provided through their respective input match networks 308a, 308b.

The PAs 50a, 50b are shown to be in communication with a bias/control circuit 52 (lines 306a, 306b). The bias/control circuit 52 can be configured to provide bias and/or control functionality for the PAs 50a, 50b in known manners, based on, for example, a control signal input 304. In some embodiments, the bias/control circuit 52 can be implemented in a die that is separate from the PA die 302. In some embodiments, the bias/control circuit 52 can be implemented in the same die as the PA die 302.

An output of the first PA 50a is shown to be connected to a first matching network 60a. Similarly, an output of the second PA 50b is shown to be connected to a second matching network 60b.

An output of the first matching network 60a is shown to be connected to a first adjustment circuit 102a having one or more features described herein. Similarly, an output of the second matching network 60b is shown to be connected to a second adjustment circuit 102b having one or more features described herein. In some embodiments, an inductance associated with each of the first and second adjustment circuits 102a, 102b can be provided by a discrete component (e.g., surface-mounted inductor), one or more conductor paths, or some combination thereof. In embodiments where a capacitance is in series with the foregoing inductance, such a capacitance can be provided by, for example, a discrete component (e.g., surface-mounted capacitor).

An output of the first adjustment circuit 102a is shown to be connected to a power coupling section 70a before being routed to an output node (RFOUT_A). Similarly, an output of the second adjustment circuit 102b is shown to be connected to a power coupling section 70b before being routed to an output node (RFOUT_B). In the example shown, the first and second power coupling sections 70a, 70b are shown to be daisy-chained together between a coupler input 310 and an output 312.

As described herein, the foregoing daisy-chain between the power-coupling sections can result in one signal path (e.g., a low-band path) impacting the other signal path (e.g., high-band path) by way of, for example, a notch response in one or more operating bands associated with the other signal path (e.g., high-band path). In some situations, the reverse effect (e.g., the high-band impacting the low-band through the daisy-chain coupling) may not be present, be present in relatively low magnitude, or be present in a frequency range that is of little or no concern (e.g., in a frequency range that is not used by any bands). In the context of the example high band described herein, notch-responses associated with such a high band are typically located at much higher frequencies (e.g., between 5 to 6 GHz) that generally do not impact other operating bands. Accordingly, in such a situation, the first signal path (e.g., a high-band path) may or may not have an adjustment circuit (102a). Thus, it will be understood that for a plurality of signal paths as described herein, some or all of such paths can include adjustment circuit(s).

In the example module 300 of FIG. 15, various components described herein can be provided or formed on or within a packaging substrate 320. In some embodiments, the packaging substrate 320 can include a laminate substrate. In some embodiments, the module 300 can also include one or more packaging structures to, for example, provide protection and facilitate easier handling of the module 300. Such a packaging structure can include an overmold formed over the packaging substrate 320 and dimensioned to substantially encapsulate the various circuits and components thereon.

In some implementations, a device and/or a circuit having one or more features described herein can be included in an RF device such as a wireless device. Such a device and/or a circuit can be implemented directly in the wireless device, in a modular form as described herein, or in some combination thereof. In some embodiments, such a wireless device can include, for example, a cellular phone, a smart-phone, a hand-held wireless device with or without phone functionality, a wireless tablet, etc.

Figure 16A:
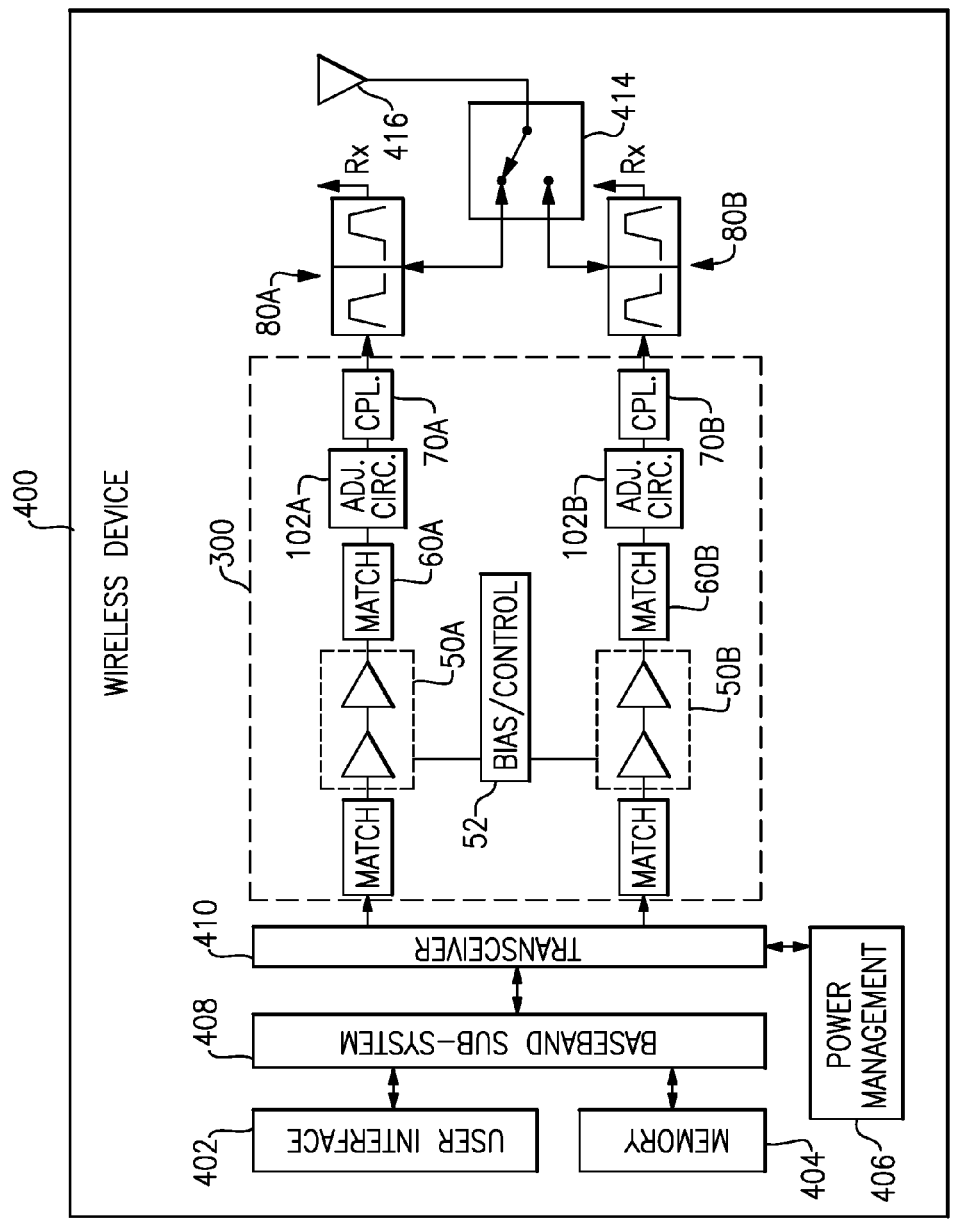
FIGS. 16A and 16B shows that in some embodiments, one or more features of the present disclosure can be implemented in wireless devices.
Figure 16B:
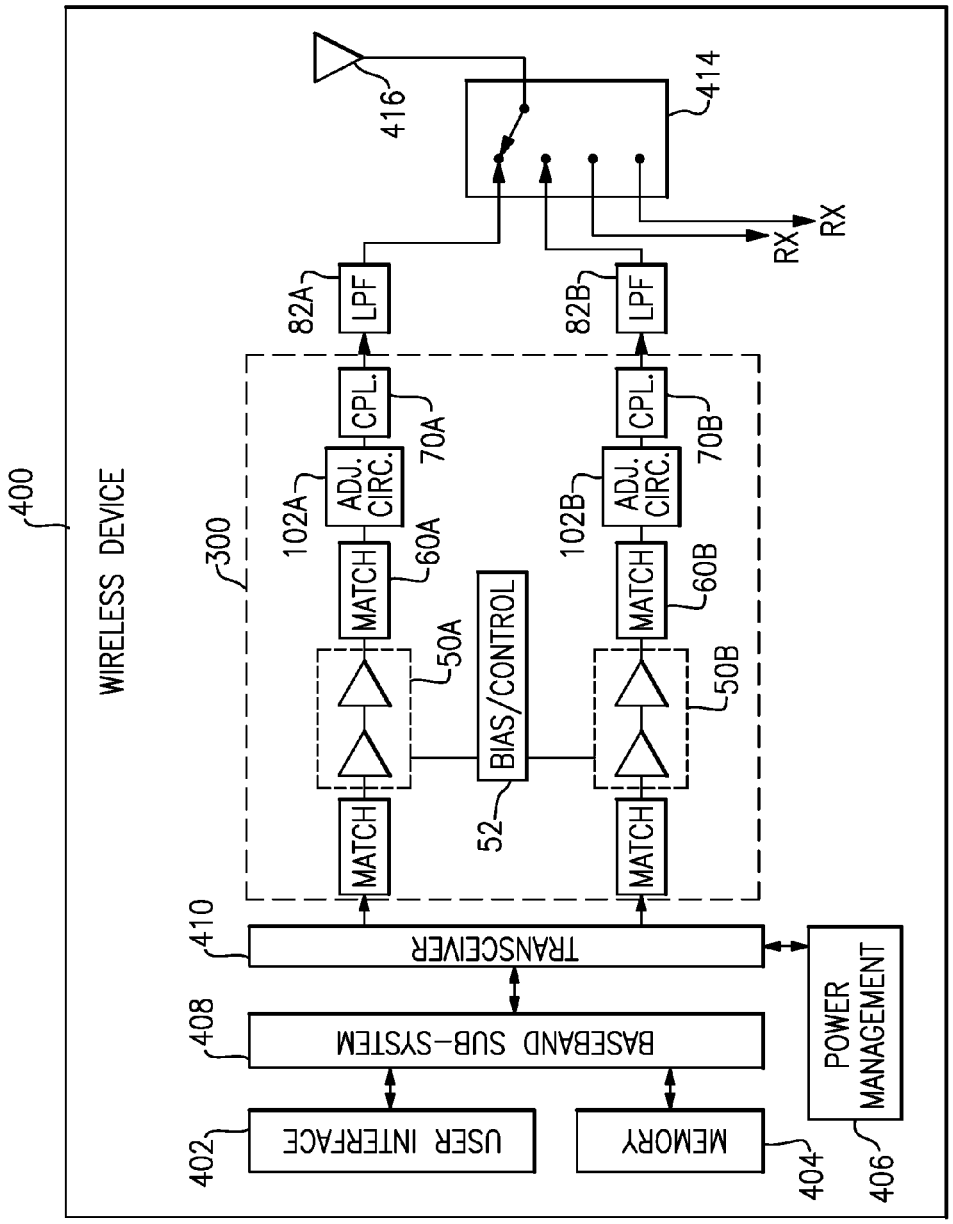

FIGS. 16A and 16B schematically depict an example wireless device 400 having one or more advantageous features described herein. The example shown in FIG. 16A is for a frequency-division duplexing (FDD) configuration, and the example shown in FIG. 16B is for a time-division duplexing (TDD) configuration.

In each of the two example wireless devices of FIGS. 16A and 16B, PAs 50, their input and output matching circuits (60), adjustment circuits 102, and coupling circuits 70 can be implemented on a module 300 as described in FIG. 15. The PAs 50 can receive their respective RF signals from a transceiver 410 that can be configured and operated in known manners. The transceiver 410 can be configured to generate the RF signals to be amplified and transmitted, and to process received signals. The transceiver 410 is shown to interact with a baseband sub-system 408 that is configured to provide conversion between data and/or voice signals suitable for a user and RF signals suitable for the transceiver 410. The transceiver 410 is also shown to be connected to a power management component 406 that is configured to manage power for the operation of the wireless device. Such power management can also control operations of the baseband sub-system 408 and the module 300.

The baseband sub-system 408 is shown to be connected to a user interface 402 to facilitate various input and output of voice and/or data provided to and received from the user. The baseband sub-system 408 can also be connected to a memory 404 that is configured to store data and/or instructions to facilitate the operation of the wireless device, and/or to provide storage of information for the user.

In the example wireless device 400 of FIG. 16A, outputs of the module 300 are shown to be routed to an antenna 416 via their respective duplexers 80a, 80b and a band-selection switch 414. The band-selection switch 414 can include, for example, a single-pole-double-throw (e.g., SPDT) switch to allow selection of an operating band. Although depicted in the context of the two-band output of the module 300, it will be understood that the number of operating bands can be different. In configurations where multiple bands are involved, such a band-selection switch can have, for example, an SPMT (single-pole-multiple-throw) configuration.

In the example of FIG. 16A, each duplexer 80 can allow transmit and receive operations to be performed substantially simultaneously using a common antenna (e.g., 416). In FIG. 16A, received signals are shown to be routed to "Rx" paths (not shown) that can include, for example, a low-noise amplifier (LNA).

In the example wireless device 400 of FIG. 16B, time-division duplexing (TDD) functionality can be facilitated by low-pass filters (LPF) 82a, 82b connected to the two example outputs of the module 300. The paths out of the filters 82a, 82b are shown to be connected to an antenna through a switch 414. In such a TDD configuration, Rx path(s) can come out of the switch 414. Thus, the switch 414 can act as band selector (e.g., between high-band and low-band as described herein), as well as a Tx/Rx (TR) switch.

In the example wireless devices 400 depicted in FIGS. 16A and 16B, the example module 300 is depicted as including the PAs (50a, 50b) and their respective matching circuits (60a, 60b), adjustment circuits (102a, 102b), and coupler sections (70a, 70b). In some embodiments, the module 300 of FIG. 16A can include some or all of the duplexers 80a, 80b and the switch 414. In some embodiments, the module 300 of FIG. 16B can include some or all of the filters 82a, 82b and the switch 414.

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS.

Various examples are described herein in the context of E-UTRA (Evolved Universal Terrestrial Radio Access) operating bands. Such bands can include frequency bands listed in Table 3.

TABLE 3

| Operating band | Frequency band (MHz) |
| --- | --- |
| 1 | 2,100 |
| 2 | 1,900 |
| 3 | 1,800 |
| 4 | 1,700 |
| 5 | 850 |
| 6 | 800 |
| 7 | 2,600 |
| 8 | 900 |
| 9 | 1,700 |
| 10 | 1,700 |
| 11 | 1,500 |
| 12 | 700 |
| 13 | 700 |
| 14 | 700 |
| 17 | 700 |
| 18 | 800 |
| 19 | 800 |
| 20 | 800 |
| 21 | 1,500 |
| 22 | 3,500 |
| 23 | 2,000 |
| 24 | 1,600 |
| 25 | 1,900 |
| 26 | 850 |
| 27 | 800 |
| 28 | 700 |
| 29 | 800 |
| 30 | 2,300 |
| 33 | 2,100 |
| 34 | 2,100 |
| 35 | 1,900 |
| 36 | 1,900 |
| 37 | 1,900 |
| 38 | 2,600 |
| 39 | 1,900 |
| 40 | 2,300 |
| 41 | 2,500 |
| 42 | 3,500 |
| 43 | 3,700 |
| 44 | 700 |

It will be understood that each of the example frequency bands listed in Table 3 can include one or more frequency ranges. For example, a FDD band can be associated with a transmit frequency range and a receive frequency range. For a TDD band, a given frequency range can facilitate both transmit and receive operations. It will also be understood that one or more features of the present disclosure can be implemented in other band-designation conventions.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A radio-frequency circuit comprising:
   a first amplifier having an output, and configured to operate in a frequency range that includes a first band;
   a second amplifier having an output, and configured to operate in a frequency range that includes a second band;
   a power detector circuit including a first coupler implemented to detect power of an amplified signal from the first amplifier, and a second coupler connected to the first coupler and implemented to detect power of an amplified signal from the second amplifier; and
   an output circuit implemented between the second amplifier and the second coupler, and configured to move a frequency response feature, resulting at least in part from the second coupler, away from the first band.

2. The radio-frequency circuit of claim 1 wherein the frequency response feature is moved to a lower frequency.

3. The radio-frequency circuit of claim 1 wherein the output circuit includes an output match network and an adjustment circuit having an inductance implemented after the output match network.

4. The radio-frequency circuit of claim 3 wherein the inductance includes an inductor.

5. The radio-frequency circuit of claim 3 wherein the adjustment circuit further includes a capacitance connected in series with the inductance.

6. The radio-frequency circuit of claim 5 wherein the capacitance includes a capacitor.

7. The radio-frequency circuit of claim 3 further comprising an output match network implemented at the output of the first amplifier, each of the output match network associated with the first amplifier and the output match network associated with the second amplifier including a matching inductance connected to the output of the corresponding amplifier, and a shunt capacitance connected to an output of the matching inductance.

8. The radio-frequency circuit of claim 1 wherein the frequency response feature includes a notch in a power spectrum associated with the second coupler.

9. The radio-frequency circuit of claim 1 wherein the first band includes or at least partially overlaps with an E-UTRA band B7, B38 or B40.

10. The radio-frequency circuit of claim 9 wherein the frequency response feature is moved to a frequency range that does not overlap with the first band.

11. The radio-frequency circuit of claim 10 wherein the frequency range to which the frequency response feature is moved includes a frequency range between E-UTRA bands B8 and B4.

12. A method for operating a radio-frequency device, the method comprising:
    amplifying a signal with a first amplifier having an output and configured to operate in a frequency range that includes a first band;
    providing a second amplifier having an output and configured to operate in a frequency range that includes a second band;
    detecting power of the amplified signal from the first amplifier with a first coupler of a power detector circuit that further includes a second coupler connected to the first coupler and capable of detecting power of an amplified signal from the second amplifier; and
    moving a frequency response feature away from the first band with an output circuit implemented between the second amplifier and the second coupler, the frequency response feature resulting at least in part from the second coupler.

13. The method of claim 12 wherein the frequency response feature is moved to a lower frequency.

14. The method of claim 12 wherein the output circuit includes an output match network and an adjustment circuit having an inductance implemented after the output match network.

15. The method of claim 14 wherein the adjustment circuit further includes a capacitance connected in series with the inductance.

16. The method of claim 12 wherein the frequency response feature includes a notch in a power spectrum associated with the second coupler.

17. A wireless device comprising:
    a transceiver configured to process signals;
    an antenna in communication with the transceiver and configured to facilitate transmission of an amplified signal; and
    a power amplifier circuit implemented between the transceiver and the antenna, and configured to generate the amplified signal, the power amplifier circuit including a first amplifier having an output, and configured to operate in a frequency range that includes a first band; a second amplifier having an output, and configured to operate in a frequency range that includes a second band; a power detector circuit including a first coupler implemented to detect power of an amplified signal from the first amplifier, and a second coupler connected to the first coupler and implemented to detect power of an amplified signal from the second amplifier; and an output circuit implemented between the second amplifier and the second coupler, and configured to move a frequency response feature, resulting at least in part from the second coupler, away from the first band.

* * * * *